US006140437A

United States Patent [19]

Kitaichi et al.

[11] Patent Number: 6,140,437

[45] Date of Patent: Oct. 31, 2000

[54] FLUORINE-CONTAINING ELASTIC COPOLYMERS, CURABLE COMPOSITION CONTAINING THE SAME AND SEALANT MADE THEREFROM

[75] Inventors: Masanori Kitaichi; Hideya Saito; Yasuji Iwasaki; Mitsuru Kishine, all of Settsu, Japan

[73] Assignee: Daikin Industries Ltd., Osaka, Japan

[21] Appl. No.: 09/091,736

[22] PCT Filed: Dec. 20, 1996

[86] PCT No.: PCT/JP96/03732

§ 371 Date: Jun. 24, 1998

§ 102(e) Date: Jun. 24, 1998

[87] PCT Pub. No.: WO97/24381

PCT Pub. Date: Jul. 10, 1997

[30] Foreign Application Priority Data

Dec. 28, 1995 [JP] Japan .................................... 7-342621

[51] Int. Cl.[7] ............................ C08F 14/26; C08F 14/18; C08F 16/24

[52] U.S. Cl. .......................... 526/247; 526/206; 526/227; 526/242; 526/250

[58] Field of Search .................................... 526/206, 247, 526/250, 242

[56] References Cited

U.S. PATENT DOCUMENTS

| | | |
|---|---|---|
| 4,513,128 | 4/1985 | Uschold . |
| 4,766,190 | 8/1988 | Morita et al. . |
| 4,920,170 | 4/1990 | Abe et al. . |
| 4,973,634 | 11/1990 | Logothetis . |
| 5,001,278 | 3/1991 | Oka et al. . |

FOREIGN PATENT DOCUMENTS

| | | |
|---|---|---|
| 0130052 A1 | 1/1985 | European Pat. Off. . |
| 0199138 A3 | 10/1986 | European Pat. Off. . |
| 0219065 A2 | 4/1987 | European Pat. Off. . |
| 0472653 B1 | 3/1992 | European Pat. Off. . |
| 0683149 A2 | 11/1995 | European Pat. Off. . |
| 60-23407 | 2/1985 | Japan . |
| 62-12734 | 1/1987 | Japan . |
| 62-89713 | 4/1987 | Japan . |
| 64-22908 | 1/1989 | Japan . |
| 4-505341 | 9/1992 | Japan . |
| 563482 | 9/1993 | Japan . |
| 7-316234 | 12/1995 | Japan . |
| WO 9014367 | 11/1990 | WIPO . |
| WO 9014368 | 11/1990 | WIPO . |

*Primary Examiner*—Fred Zitomer
*Attorney, Agent, or Firm*—Birch, Stewart, Kolasch & Birch, LLP

[57] ABSTRACT

A fluorine-containing elastomeric copolymer comprising 55 to 62 mole % of repeating units derived from tetrafluoroethylene and 38 to 45 mole % of repeating units derived from perfluoro(methyl vinyl ether) which is obtained by radically polymerizing the monomers in the presence of a diiodide compound of the formula: $RI_2$ in which R is a saturated fluorohydrocarbon or chlorofluorohydrocarbon group having 1 to 16 carbon atoms, or a hydrocarbon group having 1 to 3 carbon atoms and which has a Mooney viscosity ($ML_{1+10}100°$ C.) in the range between 20 and 150. This copolymer has an excellent compression set at high temperature, which is an important property for sealing members.

5 Claims, 1 Drawing Sheet

FLUORINE-CONTAINING ELASTIC COPOLYMERS, CURABLE COMPOSITION CONTAINING THE SAME AND SEALANT MADE THEREFROM

This application is the national phase under 35 U.S.C. §371 of prior PCT International Application No. PCT/JP96/03732 which has an International filing date of Dec. 20, 1996 which designated the United States of America, the entire contents of which are hereby incorporated by reference.

FIELD OF THE INVENTION

The present invention relates to a fluorine-containing elastomeric copolymer, a curable composition comprising the same, and a sealing member prepared from the same. In particular, the present invention relates to a fluorine-containing elastomeric copolymer which is prepared by polymerizing monomers in the presence of a specific diiodide compound, a curable composition comprising the same, and a sealing member prepared from the same.

PRIOR ART

Fluorine-containing elastomeric copolymers are used in a wide variety of fields such as equipment for producing semiconductors, chemical plants, drilling rigs, space hardware, and the like, because of their excellent chemical resistance, heat resistance and compression set.

In particular, sealing members comprising the fluorine-containing elastomeric copolymers have the large merit of the reduction of running costs due to the maintenance-free. Thus, fluorine-containing elastomeric copolymers having a longer life and higher reliability are sought.

Fluorine-containing elastomeric copolymers having iodine atoms in a polymer chain, which can be cured with peroxides, can be easily vulcanized without the addition of contaminant additives such as metal oxides, and thus they are used as materials of clean sealing members which are used in the equipment for producing semiconductors. However, a copolymer of tetrafluoroethylene and a perfluorovinyl ether having a polyether-type perfluoroalkyl group has insufficient dry strength, and also inferior compression set at high temperature to commercially available cured materials of fluororubbers comprising vinylidene fluoride, as described in JP-A-62-89713 and JP-A-62-12734.

Conventional copolymers of tetrafluoroethylene-perfluoro(methyl vinyl ether) having iodine atoms, which are disclosed in JP-A-4-505345, have insufficient tensile properties and compression set.

SUMMARY OF THE INVENTION

One object of the present invention is to provide a fluorine-containing elastomeric copolymer which can provide a clean sealing member having a long life and high reliability as desired particularly in the semiconductor field.

As the result of extensive study for achieving such an object, it has been found that a fluorine-containing elastomeric copolymer comprising tetrafluoroethylene and perfluoro (methyl vinyl ether) in a specific ratio and containing an iodine atom has good dry properties, and its compression set at high temperature, which is one of the most important properties for sealing members, is better than that of a polyol-curable fluororubber comprising vinylidene fluoride and hexafluoropropylene, which has the best compression set among commercially available rubbers.

Furthermore, it has been found that such a fluorine-containing elastomeric copolymer, which is obtained by polymerizing tetrafluoroethylene and perfluoro(methyl vinyl ether) at a specific temperature (between 40 and 60° C.), has a further improved compression set.

According to the first aspect, the present invention provides a fluorine-containing elastomeric copolymer comprising 55 to 62 mole % of repeating units derived from tetrafluoroethylene (TFE) and 38 to 45 mole % of repeating units derived from perfluoro(methyl vinyl ether) (PMVE) which is obtained by radically polymerizing the monomers in the presence of a diiodide compound of the formula:

$$RI_2 \qquad (1)$$

wherein R is a saturated fluorohydrocarbon or chlorofluorohydrocarbon group having 1 to 16 carbon atoms, or a hydrocarbon group having 1 to 3 carbon atoms, preferably at a temperature in the range between 40 and 60° C., and which has a Mooney viscosity ($ML_{1+10}$100° C.) in the range between 20 and 150.

According to the second aspect, the present invention provides a fluorine-containing elastomeric copolymer comprising 50 to 80 mole % of repeating units derived from tetrafluoroethylene, 20 to 50 mole % of repeating units derived from perfluoro (methyl vinyl ether), and 0.01 to 1 mole %, based on the total mole of tetrafluoroethylene and perfluoro(methyl vinyl ether), of repeating units derived from an iodine-containing fluorinated vinyl ether of the formula:

$$I(CH_2CF_2CF_2O)_m—[CF(CF_3)CF_2O]_n—CF{=}CF_2 \qquad (2)$$

wherein m is an integer of 1 to 5, and n is an integer of 0 to 3, which is obtained by radically polymerizing the monomers in the presence of a diiodide compound of the above formula (1), and which has a Mooney viscosity ($ML_{1+10}$100° C.) in the range between 20 and 150.

According to the third aspect, the present invention provides a fluorine-containing elastomeric copolymer comprising 55 to 62 mole % of repeating units derived from tetrafluoroethylene, 38 to 45 mole % of repeating units derived from perfluoro(methyl vinyl ether), and 0.01 to 1 mole %, based on the total mole of tetrafluoroethylene and perfluoro(methyl vinyl ether), of repeating units derived from an iodine-containing fluorinated vinyl ether of the above formula (2), which is obtained by radically polymerizing the monomers in the presence of a diiodide compound of the above formula (1), and which has the Mooney viscosity ($ML_{1+10}$100° C.) in the range between 20 and 150.

According to the fourth aspect, the present invention provides a curable fluorine-containing elastomeric copolymer composition comprising 100 wt. parts of the above fluorine-containing elastomeric copolymer, 0.05 to 10 wt. parts of an organic peroxide, and 0.1 to 10 wt. parts of a crosslinking aid.

According to the fifth aspect, the present invention provides a sealing member prepared from the above composition.

BRIEF DESCRIPTION OF THE INVENTION

FIG. 1 is a DSC(differential scanning calorimeter) chart for a polymer obtained in Example 1.

DETAILED DESCRIPTION OF THE INVENTION

Figure 1:
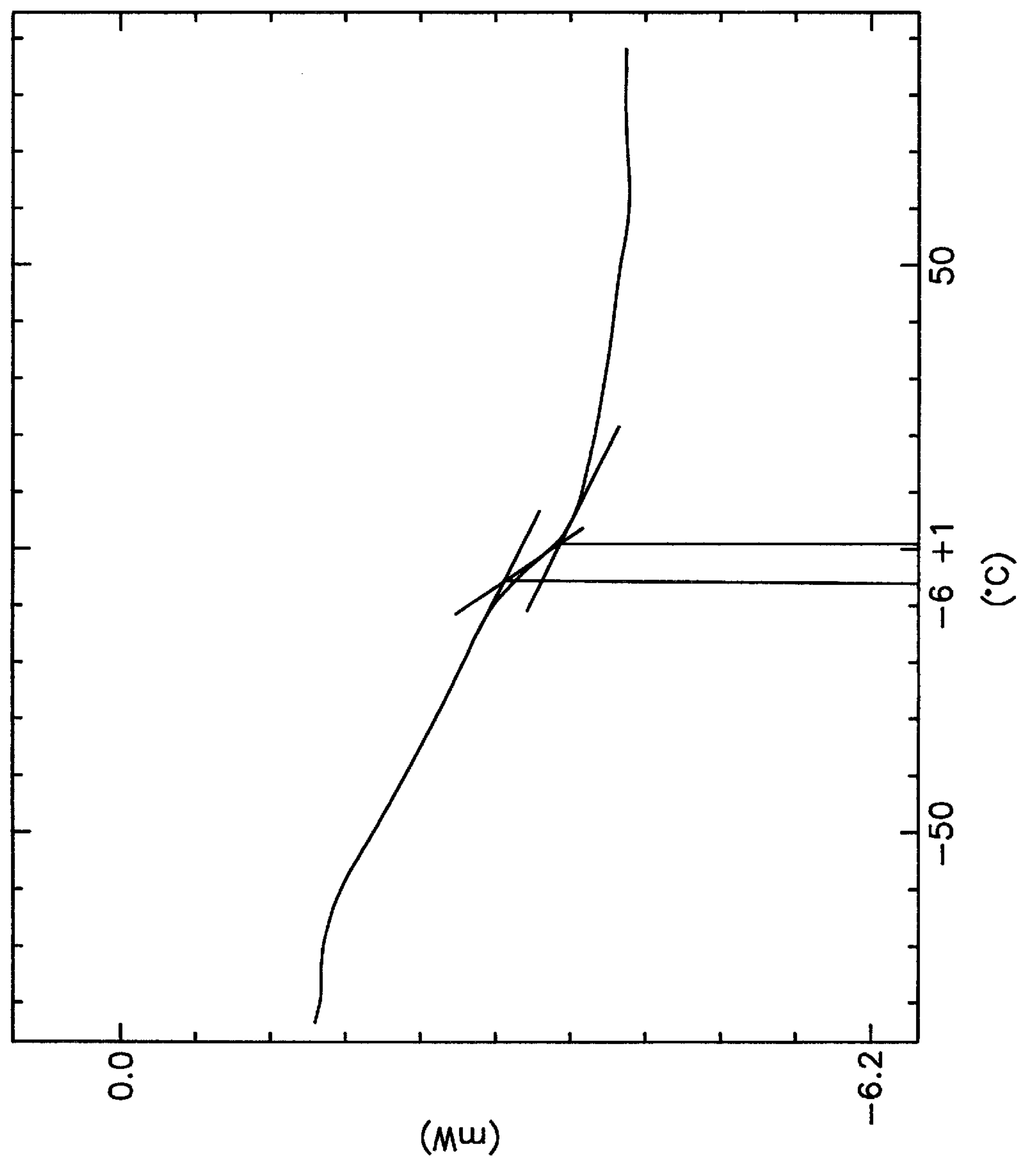

Conventional TFE/PMVE copolymers have a composition of 65–70 mole % of TFE and 30–35 mole % of PMVE in view of copolymerizability and costs, so that they exhibit rubbery properties. The polymerization has been carried out at a temperature in the range between 70 and 90° C. in the presence of ammonium persulfate.

In the case of fluorine-containing elastomeric copolymers having terminal iodine atoms, it is known that the polymer composition and polymerization temperature have unexpectedly large influences on the properties of the copolymers. However, the TFE/PMVE copolymers of the present invention comprising 55 to 62 mole % of TFE and 38 to 45 mole % of PMVE have very good compression set at high temperature which cannot be achieved by the copolymers which have the conventional monomer composition and are prepared at the conventional polymerization temperature. In addition, the copolymers of the present invention have good compression set at room temperature in spite of their relatively high Tg of about −4° C. Furthermore, the copolymers of the present invention which are prepared by carrying out the polymerization at a temperature in the range between 40 and 60° C. have further improved compression set at high and room temperatures.

This means that the polymer chains of the copolymer of the present invention with the above limited monomer composition have much higher repulsion force and recovery force than those having other monomer compositions. In addition, the polymerization temperature significantly increases the crosslinking efficiency of the cured material of the copolymer.

When the ratio of PMVE is less than 38 mole %, the compression set deteriorates. When the ratio of PMVE exceeds 45 mole %, the copolymerization rate decreases greatly, and thus the productivity of the copolymer decreases.

The fluorine-containing elastomeric copolymer of the present invention is obtained by radically copolymerizing TFE and PMVE in the presence of a diiodide compound of the above formula (1), and the amount of iodine atoms which are introduced in the copolymer from the diiodide compound of the formula (1) should be in the range between 0.01 and 1 wt. % based on the whole weight of the copolymer. The amount of the iodine atoms is calculated from the weight of the diiodide compound which is added during the polymerization. The amount of the diiodide compound which is present in the copolymer has a great influence on the determination of a molecular weight, since the diiodide compound acts as a chain transfer agent as described in JP-A-53-125491, and further the iodine atoms introduced in the polymer functions as crosslinking sites. Therefore, when the amount of the iodine atoms which are introduced in the copolymer from the diiodide compound of the formula (1) is less than 0.01 wt. % based on the whole weight of the copolymer, the molecular weight of the polymer becomes too larger, and thus the polymer loses the flowability in the curing reaction, or a crosslinking density decreases. Thus, no molded article can be obtained, or only insufficient sealing properties are achieved. When the amount of the iodine atoms exceeds 1 wt. %, the molecular weight becomes too low, and thus some troubles may arise in the kneading and molding steps.

The copolymer of the present invention may comprise 0.01 to 1 mole %, based on the total amount of TFE and PMVE, of an iodine-containing fluorinated vinyl ether of the formula:

$$I(CH_2CF_2CF_2O)_m\text{—}[CF(CF_3)CF_2O]_n\text{—}CF{=}CF_2 \quad (2)$$

wherein m is an integer of 1 to 5, and n is an integer of 0 to 3, in addition to TFE and PMVE.

Preferable examples of the iodine-containing fluorinated vinyl ether of the formula (2) are $ICH_2CF_2CF_2OCF{=}CF_2$, $I(CH_2CF_2CF_2O)_2CF{=}CF_2$, $I(CH_2CF_2CF_2O)_3CF{=}CF_2$, $ICH_2CF_2CF_2OCF(CF_3)CF_2OCF{=}CF_2$, $ICH_2CF_2CF_2O[CF(CF_3)CF_2O]_2CF{=}CF_2$, and the like.

Among them, $ICH_2CF_2CF_2OCF{=}CF_2$ is more preferable.

The terpolymer of TFE/PMVE/iodine-containing fluorinated vinyl ether is a novel copolymer, and it preferably comprises 55 to 62 mole % of TFE repeating units, 38 to 45 mole % of PMVE repeating units, and the amount of the iodine-containing fluorinated vinyl ether is between 0.01 and 1 mole % based on the total amount of TFE and PMVE.

However, the copolymer has certain effects even when the amounts of TFE repeating units and PMVE repeating units are between 50 and 80 mole % and between 20 and 50 mole %, respectively, and the amount of the iodine-containing fluorinated vinyl ether is between 0.01 and 1 mole % based on the total amount of TFE and PMVE. That is, the copolymer containing the iodine-containing fluorinated vinyl ether of the formula (2) in addition to TFE and PMVE has a compression set to a certain degree, when the amount of PMVE is at least 20 mole %, and the polymerization rate does not decrease significantly up to 50 mole % of PMVE.

The fluorine-containing elastomeric copolymer of the present invention has a Mooney viscosity ($ML_{1+10}$100° C.) of between 20 and 150. The Mooney viscosity herein used means a viscosity measured by the method defined in JIS K 6300 "Mooney viscosity measurement" at a measuring temperature of 100° C.

When the Mooney viscosity is less than 20, some trouble may arise during the kneading step. When the Mooney viscosity exceeds 150, the copolymer loses the flowability in the curing reaction.

The copolymer of the present invention may be prepared by the method described in Examples 12–15 of JP-A-62-12734 (=EP-A-199138) with modifying the kinds and amounts of monomers.

That is, TFE, PMVE and optionally other copolymerizable monomer such as HFP are radically emulsion polymerized in an aqueous medium under pressure while stirring, in the presence of a diiodide compound and in the presence of substantially no oxygen.

Typical examples of the diiodide compound which is used in the preparation of the copolymer of the present invention are 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, and 1,2-diiodoethane. These compounds may be used singly or in combination with each other. Among them, 1,4-diiodoperfluorobutane is preferable.

The amount of the diiodide compound is between 0.01 and 1 wt. % based on the whole weight of the copolymer.

It is possible to copolymerize a monomer having an iodine atom with the fluorine-containing elastomeric copolymer of the present invention. The copolymerization of a monomer having an iodine atom can further increase the compression set of the copolymer. Perfluorovinyl ether compounds are preferable as monomers having an iodine atom, in view of their compolymerizability. For example, perfluoro(6,6-dihydro-6-iodo-3-oxa-1-hexene) and perfluoro(5-iodo-3-oxa-1-pentene), which are disclosed in JP-B-5-63482 and JP-A-62-12734, are preferable.

When the polymerization temperature exceeds 60° C., the compression set tends to deteriorate although the dry properties may not be influenced. When the polymerization temperature is less than 40° C., the polymerization rate is low if a persulfate is used alone. In addition, the polymerization rate is still low, even when a redox system containing a sulfite salt, etc. is used, and furthermore, metal ions of reducing agents remain in the polymer. The polymer containing metal ions cannot be used in the field of semiconductor production.

Radical polymerization initiators which are used for the preparation of the copolymer of the present invention may be the same as those used in the conventional polymerization processes for fluorine-containing elastomers. Such initiators include organic and inorganic peroxides, and azo compounds. Specific examples of the initiator include persulfates, peroxycarbonates, peracid esters, and the like. A preferable initiator is ammonium persulfate (APS). APS may be used singly or in combination with a reducing agent such as a sulfite.

It is preferable to avoid the use of reducing agents which are the sources of metal ions, since the prepared copolymers are often used as sealing members, which are employed in an equipment for producing semiconductors which is required to have cleanness.

Emulsifiers, which are used in the emulsion polymerization for the preparation of the copolymer of the present invention, ay be selected from a wide variety of emulsifiers. Salts of carboxylic acids having a fluorocabon or fluoropolyether chain are preferable in view of the suppression of a chain transfer reaction onto emulsifier molecules during the polymerization. The amount of the emulsifier is preferably in the range between about 0.05 and 2 wt. %, in particular in the range between 0.2 and 1.5 wt. %, based on water added.

The monomer mixture gas used in the pre sent invention is explosive as described by G. H. Kalb et al, Advances in Chemistry Series, 129, 13(1973). Thus, it is necessary to devise a polymerization reactor so that no spark, that is an ignition source, will occur. In that sense, the polymerization pressure is preferably reduced as low as possible.

The polymerization pressure can be changed in a wide range. In general, the polymerization pressure is in the range between 0.5 and 5 MPa. Preferably, the polymerization pressure is at least 0.8 MPa in view of the productivity, since the polymerization rate increases as the polymerization pressure increases.

The copolymer of the present invention is crosslinked and cured (vulcanized) with various crosslinking sources to provide a fluororubber. The crosslinking sources are preferably organic peroxides, while high energy electromagnetic waves such as radiation (e.g. $\alpha$-rays, $\beta$-rays, $\gamma$-rays, electron beams , X-rays, etc.), UV-light, etc. may be used.

The amount of the organic peroxide is in the range between 0.05 and 10 wt. parts, preferably in the range between 1.0 and 5 wt. parts, per 100 wt. parts of the copolymer.

The organic peroxides are preferably peroxides which easily generate peroxy radicals by the application of heat or in the presence of redox systems. Examples of the organic peroxides include 1,1-bis(tert.-butylperoxy)-3,5,5-trimethylcyclohexane, 2,5-dimethylhexane-2,5-dihydroxyperoxide, di-tert.-butylperoxide, tert.-butylcumylperoxide, dicumylperoxide, $\alpha$,$\alpha$-bis(tert.-butylperoxy)-p-diisopropylbenzene, 2,5-dimethyl-2,5-di (tert.-butylperoxy)hexane, 2,5-dimethyl-2,5-di(tert.-butylperoxy)-hexyne-3, benzoylperoxide, tert.-butylperoxybenzene, 2,5-dimethyl-2,5-di(benzoiylperoxy) hexane, tert.-butyl peroxymaleate, tert.-butylperoxyisopropyl carbonate, and the like. Among them, diallyl type ones are preferable. In particular, 2,5-dimethyl-2,5-di(tert.-butylperoxy)hexane is preferable.

The kinds and amounts of the organic peroxides are selected by taking into account the amount of active —O—O— groups, decomposition temperatures, etc.

When the organic peroxides are used, the curing is enhanced by the combined use of crosslinking aids. Any crosslinking aids may be used, in principle, insofar as they have a reactivity with peroxy radicals and polymer radicals, and the kinds of the crosslinking aids are not limited. Preferable examples of the crosslinking aids include triallyl cyanurate, triallyl isocyanurate, trially formal, triallyl trimellitate, N,N'-m-phenylenebismaleimide, dipropargyl terephthalate, diallyl phthalate, tetraallyl terephthalic amide, triallyl phosphate, and the like. Among them, triallyl isocyanurate is particularly preferable.

The amount of the crosslinking aid is preferably in the range between 0.1 and 10 wt. parts, more preferably between 0.5 and 5 wt. parts, per 100 wt. parts of the copolymer.

The fluororubber of the present invention may be co-crosslinked with other rubber or material. Examples of the other rubber or material, which can be blended and co-crosslinked with the fluororubber of the present invention, are silicone oils, silicone rubbers, ethylene-vinyl acetate copolymers, 1,2-polybutadiene, fluorosilicone oils, fluorosilicone rubbers, fluorophosphazene rubber, hexafluoropropylene-ethylene copolymers, tetrafluoroethyene-propylene copolymers, other polymers having a radical reactivity. The amount of the other rubber or material is not limited, but should not be so large as to deteriorate the inherent properties of the copolymer of the present invention.

Furthermore, the copolymers of the present invention may contain pigments for coloring the copolymer, fillers, reinforcing materials, and the like. Examples of the generally used fillers or reinforcing materials are inorganic ones such as carbon black, $TiO_2$, $SiO_2$, clay, talc, etc., and organic ones such as fluorine-containing polymers, for example, polytetrafluoroethylene, polyvinylidene fluoride, polyvinyl fluoride, polychlorotrifluoroethylene, tetrafluoroethylene-ethylene copolymers, tetrafluoroethylene-vinylidene fluoride copolymers, and the like.

Mixing means for these curing components are suitably selected according to the viscoelasticities and states of the components. In general, open roll, powder mixers, and the like are used. Alternatively, solid components are dissolved or dispersed in solvents, and then mixed.

The curing temperature and time depend on the kind of the peroxide used. In general, the press curing is carried out at a temperature in the range between 150 and 200° C. for 3 to 30 minutes, and the oven curing is carried out at a temperature in the range between 150 and 250° C. for 1 to 24 hours.

The copolymers of the present invention are advantageously used as general molding materials, sealants, adhesives, paints, and the like. Preferable applications of the molded articles are sealing members, such as O-rings, lip-type packings, oil seals, diaphragms, gaskets, V-rings, and the like.

EXAMPLES

The present inventions will be illustrated by the following examples.

Example 1

Pure water (2 liters), $C_7F_{15}COONH_4$ (20 g) as an emulsifier and disodium hydrogen phosphate dodecahydrate (0.18 g) as a pH-regulator were charged in a SUS 316 autoclave (internal volume of 6 liter) which had no ignition source. After thoroughly replacing the internal atmosphere with nitrogen gas, the content was heated to 50° C. while stirring at 600 rpm, and then, TFE and PMVE in a molar ratio of 24:76 were injected under pressure so that the internal pressure rose to 12.0 kgf/$cm^2$G. After that, the aqueous solution of ammonium persulfate (APS) in a concentration of 186 mg/ml (2 ml) was injected under pressure of nitrogen gas to initiate a polymerization reaction.

The internal pressure dropped as the polymerization reaction proceeded. When the pressure dropped to 11.0 kgf/$cm^2$G, a diiodide compound, $I(CF_2)_4I$ (4.0 g) was injected under pressure. Then, 20.0 g of TFE was injected under its own pressure and 22.0 g of PMVE was injected with a plunger pump, and thus the increase and drop of the pressure were repeated.

After 8.4 hours from the start of the polymerization reaction, the total amount of TFE and PMVE reached 860 g. Then, the autoclave was cooled, and the unreacted monomers were discharged. An aqueous emulsion having a solid content of 30 wt. % was obtained.

The aqueous emulsion was poured in a beaker and frozen in a dry-ice/methanol bath to coagulate the polymer. After defreezing, the coagulated polymer was washed with water and dried under reduced pressure. Thus, a rubbery polymer (862 g) was obtained. The Mooney viscosity $ML_{1+10}$100° C. was 60.

The results of the $^{19}$F-NMR analysis indicated that the polymer had the monomeric unit composition of 61.7 mole % of TFE and 38.3 mole % of PMVE. The content of iodine atoms, which was calculated from the elemental analysis, was 0.18 wt. %. The glass transition temperature Tg (median) of the polymer, which was measured with a differential scanning calorimeter (DSC), was −3° C. (see the DSC chart in FIG. 1).

Example 2

A polymerization reaction was carried out in the same manner as in Example 1 except that the initial molar ratio of the monomers and the amounts of the monomers, which were charged to increase the pressure, were changed as listed in Table 1, a diiodide compound $ICH_2CF_2CF_2OCF{=}CF_2$ (each 1.5 g) was injected when the total charged amount of TFE and PMVE reached 430 g, 511 g, 596 g and 697 g, and the aqueous solution of APS in a concentration of 35 mg/ml (each 2 ml) was injected under pressure of nitrogen gas every 12 hours after the start of the polymerization reaction to continue the polymerization reaction. After 35 hours, the polymerization reaction was terminated.

The aqueous emulsion was coagulated, washed and dried in the same way as in Example 1, and thus the rubbery polymer (872 g) was obtained. The Moony viscosity ($ML_{1+10}$100° C.) of the polymer was 63. The results of the $^{19}$F-NMR analysis indicated that the polymer had the monomeric unit composition of 59.2 mole % of TFE and 40.8 mole % of PMVE. The content of iodine atoms was 0.30 wt. %.

Comparative Example 1

A polymerization reaction was carried out in the same manner as in Example 2 except that the initial molar ratio of the TFE/PMVE monomer mixture was changed to 27:73, and the amounts of the monomers, which were additionally charged, were changed as listed in Table 1. After 29 hours, the polymerization reaction was terminated.

The aqueous emulsion was coagulated, washed and dried in the same way as in Example 1, and thus the rubbery polymer (847 g) was obtained. The Mooney viscosity ($ML_{1+10}$100° C.) of the polymer was 58. The results of the $^{19}$F-NMR analysis indicated that the polymer had the monomeric unit composition of 62.9 mole % of TFE and 37.1 mole % of PMVE. The content of iodine atoms was 0.28 wt. %.

Comparative Example 2

A polymerization reaction was carried out in the same manner as in Example 2 except that the polymerization temperature was changed to 80° C., the initial molar ratio of the TFE/PMVE monomer mixture was changed to 29:71, and the concentration of the aqueous APS solution was changed to 20 mg/ml. After 45 hours, the polymerization reaction was terminated.

The aqueous emulsion was coagulated, washed and dried in the same way as in Example 1, and thus the rubbery polymer (850 g) was obtained. The Mooney viscosity ($ML_{1+10}$100° C.) of the polymer was 55. The results of the $^{19}$F-NMR analysis indicated that the polymer had the monomeric unit composition of 64.0 mole % of TFE and 36.0 mole % of PMVE. The content of iodine atoms was 0.34 wt. %.

The components shown in Table 1 were compounded in each of the copolymers obtained in Examples, and a curable composition was prepared. Then, curing properties were measured with a curastometer (JIS I type) at 160° C.

The composition was press cured at 160° C. for 10 minutes and then oven cured at 180° C. for 4 hours, and the properties of the obtained cured material were measured. The properties of the cured material were measured according to JIS K 6301. The results are shown in Table 1.

TABLE 1

| | Example 1 | Example 2 | Example 3 | Example 4 |
|---|---|---|---|---|
| Polymerization conditions | | | | |
| Temperature (° C.) | 50 | 50 | 50 | 80 |
| $I(CF_2CF_2)_2I$ (g) | 4.0 | 4.0 | 4.0 | 4.0 |
| $ICH_2CF_2CF_2OCF{=}CF_2$ (g) | — | 6.0 | 6.0 | 6.0 |
| Initial molar ratio of monomers (TFE:PMVE) | 24:76 | 20:80 | 27:73 | 29:71 |
| Amounts of supplemental monomers (g) (TFE/PMVE) | 20/22 | 19/23 | 21/21 | 22/20 |
| Polymerization time (hrs) | 8.4 | 35 | 29 | 45 |
| Polymer amount | 862 | 872 | 847 | 850 |
| Properties of uncured copolymer | | | | |
| Iodine content (wt. %) | 0.18 | 0.30 | 0.28 | 0.34 |
| Polymer composition (TFE:PMVE) | 61.7:38.3 | 59.2:40.8 | 62.9:37.1 | 64.0:36.0 |
| Mooney viscosity $ML_{1+10}$100° C. | 60 | 63 | 58 | 55 |
| Tg (° C.) (DSC measurement) | −3 | −5 | −3 | −3 |
| Curing properties (160° C.) | | | | |
| Minimum torque (kg) | 0.09 | 0.10 | 0.09 | 0.12 |
| Maximum torque (kg) | 5.13 | 5.41 | 5.24 | 4.60 |
| Induction time (min.) | 0.6 | 0.7 | 0.8 | 0.8 |
| Optimum curing time | 1.8 | 1.6 | 2.3 | 2.3 |

TABLE 1-continued

| | Example 1 | Example 2 | Example 3 | Example 4 |
|---|---|---|---|---|
| (min.) | | | | |
| Dry properties | | | | |
| 100% modulus (MPa) | 11.7 | 11.2 | 12.6 | 11.3 |
| Tensile strength (MPa) | 21.5 | 19.7 | 20.2 | 17.8 |
| Elongation at break (%) | 160 | 140 | 130 | 150 |
| Hardness (JIS A) | 84 | 82 | 82 | 83 |
| Compression set (%) (P240 O-ring) | | | | |
| Room temp. × 72 hours | 9.7 | 6.4 | 12.4 | 10.2 |
| 200° C. × 72 hours | 14.7 | 12.2 | 15.2 | 18.6 |
| 200° C. × 168 hours | 22.4 | 19.7 | 24.4 | 28.6 |

Curing composition: 100 wt. parts of a copolymer, 8 wt. parts of MT thermal carbon, 7 wt. parts of SRF carbon, 3 wt. parts of triallyl isocyanurate (TAIC), and 1 wt. part of Perhexa-2, 5B.

What is claimed is:

1. A fluorine-containing elastomeric copolymer comprising:

(a) 55 to 62 mole % of repeating units obtained from tetrafluoroethylene monomer; and (b) 38 to 45 mole % of repeating units obtained from perfluoro(methyl vinyl ether) monomer; and wherein said copolymer is obtained by radically polymerizing said monomers in the presence of a diiodide compound of the formula $$RI_2,$$

wherein R is a saturated fluorohydrocarbon or chlorofluorohydrocarbon group having 1 to 16 carbon atoms, or R is a hydrocarbon group having 1 to 3 carbon atoms; and wherein said copolymer has a Mooney viscosity ($ML_{1+10}$100° C.) in the range between 20 and 150.

2. A copolymer as in claim 1, wherein said polymerizing takes place at a temperature between 40 and 60° C.

3. A copolymer as in claim 1, further comprising:

0.01 to 1 mole %, based on the total moles of said monomers, of repeating units obtained from an iodine-containing fluorinated vinyl ether monomer of the formula:

$$I(CH_2CF_2CF_2O)_m\text{—}[CF(CF_3)CF_2O]_n\text{—}CF{=}CF_2$$

wherein m is an integer of 1 to 5, and n is an integer of 0 to 3.

4. A curable fluorine-containing elastomeric copolymer composition comprising 100 wt. parts of a fluorine-containing elastomeric copolymer as claimed in any one of claims 1 or 2, 0.05 to 10 wt. parts of an organic peroxide, and 0.1 to 10 wt. parts of a crosslinking aid.

5. A sealing member prepared from a composition as claimed in claim 4.

* * * * *